Sept. 2, 1958   J. N. MORRIS   2,849,999
FUEL INJECTION PUMPS
Filed Feb. 3, 1956
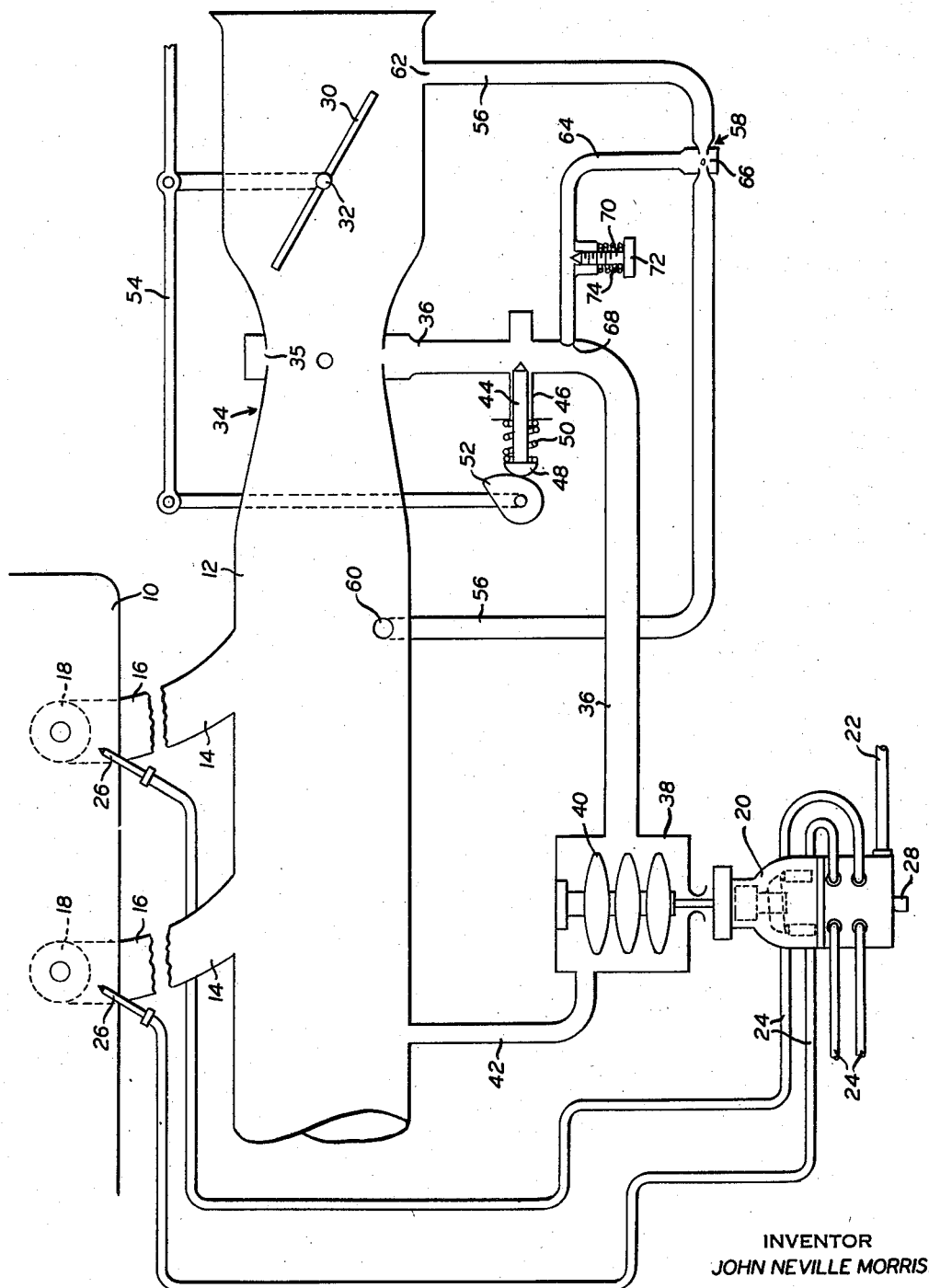
INVENTOR
JOHN NEVILLE MORRIS.
BY
Churchill, Rich, Weymouth & Engel
ATTORNEYS.

United States Patent Office 2,849,999
Patented Sept. 2, 1958

2,849,999

FUEL INJECTION PUMPS

John N. Morris, Birmingham, England, assignor to The S. U. Carburetter Co. Ltd., Erdington, Birmingham, England, a British company Application February 3, 1956, Serial No. 563,384

5 Claims. (Cl. 123—140)

This invention relates to a fuel injection system and to fuel injection apparatus for controlling the fuel/air ratio of the combustible mixture in internal combustion engines of the type having an intake air manifold controlled by a throttle valve for controlling the engine speed and having an operating characteristic such that a critical speed exists for each position of the throttle valve at which speed the mass of air induced per cycle reaches a maximum with the mass of air induced per cycle falling off at speeds above and below the critical speeds. More particularly the invention is related to apparatus for controlling a fuel injection pump by means of which liquid fuel is injected directly into the individual cylinders or inlet ports while uncarburetted air is supplied through an inlet manifold.

The usual type of engine having the above operating characteristic is the spark-ignition engine operating on a four-stroke cycle. In one type of positive displacement fuel injection pump the quantity of fuel delivered per cycle by the pump is controlled either by the movement of or by the force exerted by the free and unconstrained end of a sealed pressure-sensitive capsule or a stack of such capsules, this movement or force being in turn responsive to a combination of the pneumatic pressure applied to an enclosure containing the capsule or stack of capsules, and of the internal pressure exerted by a hermetically sealed quantity of gas contained within the capsule or stack of capsules, this last mentioned pressure depending upon the temperature of the imprisoned gas which is assumed to be substantially equal to the temperature of the air in the capsule enclosure. Consequently, in the event of a direct pneumatic communication being established between the capsule enclosure and the air intake manifold of the engine, the quantity of fuel delivered by the injection pump per cycle, assuming the temperature of the air in the capsule enclosure to remain constant, will depend solely upon the intake manifold pressure. The pump will, therefore, deliver a constant quantity of fuel per cycle in relation to the mass of air induced by the engine cylinders per cycle, only to the extent that the mass of air is solely dependent upon the intake manifold pressure.

In a four-stroke engine of orthodox construction, the mass of air induced is solely dependent upon intake manifold pressure over a narrow range of engine speeds only. In practice, the air mass induced per cycle by the cylinders for a given intake manifold pressure attains a maximum value at some intermediate point in the speed range of the engine, and deteriorates or falls off both below and above this speed. The degree to which this deterioration occurs on either side of the optimum air-filling speed will depend upon the inlet valve timing characteristics of the engine, also upon the degree of restriction to the inflow of the air from the manifold to the cylinders imposed inter alia by limitations of inlet port and valve area.

The main object of the invention is to provide apparatus for regulating the amount of fuel delivered by the pump per cycle in accordance with the variations in air-input per cycle, or, in other words, to compensate the fuel delivery per cycle for the varying volumetric efficiency of the engine.

A further object of the invention is to provide apparatus for maintaining a continuous circulation of air from the intake manifold through the capsule enclosure. This not only insures that the temperature ambient to the capsule or capsule stack is substantially equal to that existing in the intake manifold, but permits the capsule enclosure, which may conveniently be integral with the main body of the injection pump, to be situated remotely from the intake manifold and connected to it by ducts or tubing.

As previously stated the output of one type of fuel injection pump per cycle of the engine is regulated in accordance with the pressure and temperature of the air in an enclosure which contains a pressure and temperature sensitive device. The essence of the present invention is the provision of a duct of relatively large cross-sectional area (substantial flow capacity) connected between the aforesaid capsule enclosure and the throat of a venturi which is incorporated in the intake manifold downstream of the throttle valve controlling the air supply to the engine, and a duct of relatively small cross-sectional area (small flow capacity) connected between the above enclosure and the intake manifold downstream of the venturi.

A further feature of the invention is that the above mentioned duct of relatively large cross-sectional area is fitted with a valve for variably restricting the flow of air through the duct. The setting of the valve is automatically correlated with that of the air throttle valve by means of suitable linkage so that the restricting effect of the valve is progressively reduced as the opening of the air throttle valve is increased, and vice versa. Further objects and advantages of the invention will appear as well as a better understanding thereof after reading the following detailed description in conjunction with the accompanying drawing in which:

The sole figure shows in diagrammatic manner the various component parts which combine to provide an exemplary embodiment of the present invention.

A multicylinder, spark-ignition engine, part of the cylinder block of which is indicated at 10 in the drawing, has an intake manifold 12 from which branch pipes 14 (only two of which are illustrated) lead to the respective inlet ports 16 each of which is controlled by the usual poppet valve 18. A variable-delivery, liquid-fuel injection pump 20 having a suction line 22 and discharge lines 24, supplies (in the required firing order) each of the injection nozzles 26 fitted to the respective inlet ports 16. The pump 20 is provided with a driving spindle 28.

An air throttle valve 30, of the conventional butterfly type, is mounted on a spindle 32 in the intake manifold 12. A venturi 34 is disposed within the intake manifold between the valve 30 and the engine 10. From the throat 35 of the venturi 34 a duct 36 leads to an enclosure or housing 38 containing a stack of pressure sensitive capsules 40. The capsules 40 comprise a pressure and temperature sensitive regulating element as previously described. Contraction and expansion of the capsule stack is arranged to regulate the effective stroke of the pump plungers. It shall be assumed throughout the present discussion that as the capsule stack 40 expands the stroke of the pump plungers is decreased. A duct 42, of substantially smaller cross-sectional area than the duct 36 is connected between the enclosure 38 and the intake manifold 12 at a point between the venturi 34 and the engine 10. The cross-sectional area of the duct 36 is made preferably not less than three times larger than that of the duct 42 for a reason which will become apparent when the operation of the system is discussed below.

Valve means in the form of a pin or needle valve 44 are provided in the duct 36 for variably restricting the flow of air therethrough. The pin valve 44 is slidable in a gland 46 and fitted with a cam follower 48 and a return spring 50. The cam follower 48 cooperates with a cam 52 which is actuated by the intermediary of the mechanical linkage 54 in unison with the throttle valve 30. When the throttle valve 30 occupies its full open position the cam follower 48 will sit upon the lowest point of the cam 52. Thus, the valve 44 will be fully open and the passage through the duct 36 will be unrestricted. As the throttle valve 30 is moved towards its closed position the cam 52 will be actuated to urge the valve 44 toward its own closed position. Thus when the throttle valve 30 occupies its idling or closed position the passage in the duct 36 will be substantially completely restricted.

A by-pass duct 56 including an auxiliary venturi 58 is connected to the manifold 12 between a point 60 downstream of the venturi 34 and a point 62 upstream of the throttle valve 30. A further duct 64 interconnects the throat 66 of the venturi 58 with the duct 36 at a point 68 between the valve 44 and the injection pump enclosure 38. The further duct 64 has a preset flow capacity determined by a manually adjustable valve means 70. The valve means 70 comprises a threaded valve stem provided with an adjusting knob 72 and surrounded by a friction lock in the form of a spring 74. For reasons to be explained below, the ducts 56 and 64 are provided with cross-sectional areas which are substantially less than the cross-sectional area of the duct 36. Like the duct 42 the ducts 56 and 64 are preferably at least three times smaller in cross-sectional area than the duct 36.

The operation of the system will now be considered. With the air throttle valve 30 occupying the fully opened or substantially fully opened position air will flow from the atmosphere via the venturi 34 and the intake manifold 12 through the branch pipes 14 into the inlet ports 16. As is well known, the pressure at the throat 35 of the venturi 34 will be substantially less than that prevailing downstream thereof in the intake manifold 12 (i. e., at 60 or at the mouth of duct 42). Thus a flow of air will be promoted from the intake manifold 12 through duct 42, capsule enclosure 38 and duct 36 into the throat 35 of the venturi 34. Since the cross-sectional area of the duct 36 is substantially larger than that of the duct 42, as previously noted, the pressure within the capsule enclosure 38 will be substantially equal to that prevailing at the throat 35 of the venturi 34. This condition will prevail only so long as the throttle valve 30 is maintained at or near its fully opened position. The reason for it not prevailing as the throttle valve is closed is due to the presence of the valve 44 which will commence to restrict the flow of air through the duct 36.

Still considering the condition with the throttle valve substantially fully opened and thus a particular high pressure existing in the manifold 12, assume that the load imposed upon the engine is such that its speed is at the critical value at which the mass of air induced per cycle is a maximum. Under this condition the fuel injection pump 20 can be adjusted such that the fuel input per cycle is exactly appropriate to provide the required fuel/air ratio. If now the load is progressively reduced so that the engine speed increases, the velocity of the air flowing through the venturi 34 will increase. This causes a progressively increasing difference of pressure to arise as between the throat 35 of the venturi 34 and the intake manifold 12. Since the throttle valve 30 is substantially fully opened the air pressure in the intake manifold 12 downstream of the venturi 34, although it will drop, will drop only a slight amount. However, the pressure in the enclosure 38 to which the capsule stack 40 is subjected will follow the greater drop in pressure occurring at the throat 35 of the venturi 34. In this way, assuming proper choice of the venturi 34 with respect to the characteristics of the engine 10, the amount of fuel supplied to the engine per cycle will be decreased in order to compensate for the previously described deterioration in the mass of air induced per cycle by the engine as its speed increases above the critical speed for the particular static manifold pressure. It should be understood, of course, that the slight drop in static pressure occurring in the manifold proper is inadequate to be employed directly for the desired control.

It will be appreciated that throughout this phase of operation there is a continuous circulation of air through the ducts 42 and 36 and the enclosure 38. This insures that the temperature of the air surrounding the capsule stack 40, and hence the temperature of the gas contained within the capsule stack, will remain substantially equal to that of the air in the intake manifold 12.

As is well known, as long as the throttle valve 30 is maintained substantially fully opened the pressure downstream thereof in the intake manifold 12 will only be slightly lower than atmospheric pressure or the pressure prevailing upstream of the throttle valve. Thus under the presently assumed operating conditions, only a small volume of air will by-pass the throttle valve 30 and the venturi 34 by way of the duct 56 and its venturi 58. The pressure at the throat 66 of the venturi 58 may be greater or lesser than that existing at the point 68 where the interconnecting duct 64 joins the larger duct 36. Hence the flow of air within the duct 64 may be in either direction. But as previously mentioned the cross-sectional area of each of the ducts 56 and 64 is made small relative to that of the duct 36 and thus the flow of air in duct 64 will have substantially no effect upon the flow of air through the duct 36 and thus upon the pressure prevailing therein.

The compensation achieved during operation with the throttle valve substantially fully opened as described above will continue to be effective under part load conditions when the air throttle valve 30 is partially closed. That is, the previously mentioned compensation will prevail until the throttle valve 30 is closed far enough to cause the valve 44, which is actuated in unison therewith, to appreciably restrict the passage in the duct 36.

Under the conditions so far considered, namely, so long as the valve 44 is substantially ineffective, no compensation is provided, in respect to the fuel pump metering, for deterioration in the mass of air induced per cycle by the engine when its speed falls below the critical speed of maximum filling. Accordingly at these lower engine speeds the fuel air mixture tends to become progressively richer as the engine speed falls. This is, however, of little practical importance since only the fuel consumption of the engine under full load operation at low speeds is affected and some degree of richening of the fuel/air mixture under these conditions has little effect, in the case where the engine is fitted to a vehicle, upon its road consumption.

When the air throttle valve 30 is closed to the point corresponding to the idling condition of the engine or near to such point the air flow through the venturi 34 will be too small to cause any sensible difference in pressure between that prevailing at the venturi throat 35 and downstream within the manifold 12. By means of the mechanical linkage 54 the valve 44 will be substantially closed and the passage through the duct 36 consequently will be substantially restricted. At the same time there will be a considerable pressure drop across the air throttle valve 30 and, therefore, via the duct 56, across the auxiliary venturi 58. In consequence the pressure at the venturi throat 66 will be lower than that at point 60 within the intake manifold 12. Assuming that the valve 44 and the valve means 70 are both fully closed, the pressure within the capsule enclosure 38 will be identical with that within the intake manifold 12 because of the connection thereto via the duct 42.

However, if this were the case under the presently assumed operating condition of the engine the pressure within the capsule enclosure 38 would be such as to give rise to a combustible mixture which is somewhat too rich. This follows since the engine speed is below that at which for a given manifold pressure the maximum mass of air is induced per cycle. Compensation for this over rich condition may be effected by partially withdrawing or opening the manually adjustable valve means 70. This will permit a flow of air from the intake manifold 12 through the duct 42, the capsule enclosure 38, the duct 36 and the duct 64 to the throat 66 of the auxiliary venturi 58 where, as previously mentioned, the pressure is substantially lower than that within the intake manifold 12.

In order to achieve the compensation effect just described, it is not necessary that the duct 36 be entirely restricted by the valve 44. Over a certain range of opening of the air throttle valve 30 from the idling condition, progressive withdrawal or opening of the valve 44 (if properly correlated to the air throttle valve movement, as for instance by the cam 52 and its follower 48) will, in conjunction with appropriate adjustment of the valve means 70, and the restricted condition of the duct 36, result in any required diminution in the pressure within the capsule enclosure 38 as compared with the pressure within the intake manifold 12, in accordance with the degree of opening of the air throttle valve 30.

There has thus been described a system for injecting fuel into the cylinders of an internal combustion engine in a manner to achieve a substantially optimum fuel/air mixture at the extreme opened and closed positions of the throttle valve and for a considerable range of movement thereof away from such end or terminal positions. The result is to produce a system which is fairly well compensated throughout the entire range of movement of the throttle valve.

What I claim is:

1. A fuel injection system for a spark-ignition, four-stroke internal combustion engine comprising: a fuel injection pump for supplying fuel to the engine cylinders and having a pressure and temperature sensitive regulating element disposed in an enclosure and responsive to the temperature and pressure of the medium surrounding said element within the enclosure for regulating the pump output per cycle, a decrease in pump output being caused by an increase and decrease in said temperature and pressure, respectively; an air intake manifold for said engine; a throttle valve in said manifold; a venturi disposed in said manifold between said valve and the engine; a first duct having a given flow capacity coupled between said enclosure and the throat of said venturi; and a second duct coupled between said enclosure and a point in said manifold between said venturi and the engine, said second duct having a flow capacity sufficiently lower than said given capacity such that the pressure within said enclosure can be maintained at or near the pressure existing at the throat of said venturi; whereby a continuous flow of air is maintained through said enclosure from the manifold to the throat of the venturi, as long as the engine is inducing air through the manifold, for actuating said regulating element as a function of manifold air temperature; and whereby a change in manifold air velocity, although associated with only a slight change in static manifold pressure, will cause a substantially greater change in pressure within said enclosure operative upon said pressure element thereby to prevent unwanted enrichment of the fuel/air ratio.

2. A fuel injection system according to claim 1, wherein valve means are provided in said first duct for variably restricting the passage therethrough, said valve means being operatively coupled to said throttle valve such that closure of said throttle valve is accompanied by simultaneous closure of said valve means, whereby the pressure within said regulating element enclosure is permitted to depart further and further from the pressure at the venturi throat as the throttle valve is progressively closed.

3. A fuel injection system according to claim 2, wherein the cross-sectional area of the first duct is at least three times larger than the cross-sectional area of the second duct.

4. A fuel injection system for a spark-ignition, four-stroke internal combustion engine comprising: a fuel injection pump for supplying fuel to the engine cylinders and having a pressure and temperature sensitive regulating element disposed in an enclosure and responsive to the temperature and pressure of the medium surrounding said element within the enclosure for regulating the pump output per cycle, a decrease in pump output being caused by an increase and decrease in said temperature and pressure, respectively; an air intake manifold for said engine; a throttle valve in said manifold, said engine having an operating characteristic such that a critical speed exists for each position of said throttle valve at which speed the mass of air induced per cycle reaches a maximum with the mass of air induced per cycle falling off at speeds above and below said critical speeds; a venturi disposed in said manifold between said valve and the engine; a first duct having a given flow capacity coupled between said enclosure and the throat of said venturi; a second duct coupled between said enclosure and a point in said manifold between said venturi and the engine, said second duct having a flow capacity sufficiently lower than said given capacity such that the pressure within said enclosure can be maintained at or near the pressure existing at the throat of said venturi; valve means disposed in said first duct for variably restricting the flow therethrough, unrestricted flow being permitted when the valve means is open; linkage means operatively coupling said valve means to said throttle valve for simultaneous operation with said throttle valve, said linkage means being such that closure of said throttle valve is accompanied by simultaneous closure of said valve means in accordance with a predetermined schedule; a bypass duct including an auxiliary venture coupling a point on said manifold downstream of said venturi with a point on said manifold upstream of said throttle valve; and a further duct having a preset flow capacity interconnecting the throat of said auxiliary venturi with said first duct at a point between said valve means and said enclosure, said further duct having a flow capacity sufficiently lower than the given capacity of said first duct such that flow of air through said further duct while said first duct is substantially unrestricted by said valve means has little or no effect upon the pressure in said first duct, but large enough such that the pressure at the throat of the auxiliary venturi determines in part the pressure in said enclosure whenever said first duct is substantially restricted by said valve means, thereby to prevent unwanted enrichment of the fuel/air ratio whenever the engine speed departs from said critical speeds for a given range of throttle valve positions from idle position to slightly open.

5. A fuel injection system according to claim 4, wherein manually adjustable valve means are disposed in said further duct for presetting the flow capacity thereof and thus determining the compensation characteristic of the apparatus.

References Cited in the file of this patent

UNITED STATES PATENTS 2,749,898    Isley                June 12, 1956

FOREIGN PATENTS 576,886    Great Britain        Apr. 15, 1946